(12) United States Patent
Nathan et al.

(10) Patent No.: US 6,567,548 B2
(45) Date of Patent: *May 20, 2003

(54) HANDWRITING RECOGNITION SYSTEM AND METHOD USING COMPOUND CHARACTERS FOR IMPROVED RECOGNITION ACCURACY

(75) Inventors: Krishna S. Nathan, New York, NY (US); Michael P. Perrone, Yorktown, NY (US); John F. Pitrelli, Danbury, CT (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/240,362

(22) Filed: Jan. 29, 1999

(65) Prior Publication Data

US 2002/0067852 A1 Jun. 6, 2002

(51) Int. Cl.[7] ................................................ G06K 9/18
(52) U.S. Cl. ........................ 382/186; 382/159; 382/179; 382/187
(58) Field of Search ................. 382/177–199, 382/186–188, 228–230; 706/12

(56) References Cited

U.S. PATENT DOCUMENTS

| | | | | | |
|---|---|---|---|---|---|
| 5,396,566 A | * | 3/1995 | Bruce et al. | ................ | 382/187 |
| 5,511,135 A | * | 4/1996 | Rhyne et al. | ................ | 382/187 |
| 5,528,701 A | * | 6/1996 | Aref | ............................ | 382/178 |
| 5,544,260 A | * | 8/1996 | Chefalas et al. | ............ | 382/187 |
| 5,689,620 A | * | 11/1997 | Kopec et al. | .................. | 706/12 |
| 5,727,081 A | * | 3/1998 | Burges et al. | ............... | 382/229 |
| 5,727,130 A | * | 3/1998 | Hung | .......................... | 706/13 |
| 5,734,749 A | * | 3/1998 | Yamada et al. | ............. | 382/187 |
| 5,818,963 A | * | 10/1998 | Murdock et al. | ........... | 382/187 |
| 5,862,259 A | * | 1/1999 | Bokser et al. | .............. | 382/228 |
| 5,881,169 A | * | 3/1999 | Henry, Jr. | .................... | 382/187 |
| 6,021,218 A | * | 2/2000 | Capps et al. | ................. | 382/187 |
| 6,108,444 A | * | 8/2000 | Syeda-Mahmood | ......... | 382/186 |

* cited by examiner

*Primary Examiner*—Bhavesh Mehta
*Assistant Examiner*—Gregory Desire
(74) *Attorney, Agent, or Firm*—F. Chau&Associates, LLP

(57) ABSTRACT

A handwriting recognition system and method whereby various character sequences (which are typically "slurred" together when handwritten) are each modelled as a single character ("compound character model") so as to provide increased decoding accuracy for slurred handwritten character sequences. In one aspect of the present invention, a method for generating a handwriting recognition system having compound character models comprises the steps of: providing an initial handwriting recognition system having individual character models; collecting and labelling a set of handwriting data; aligning the labelled set of handwriting data; generating compound character data using the aligned handwriting data; and retraining the initial recognition system with the compound character data to generate a new recognition system having compound character models. Once these compound character models are trained, they may be used to accurately decode slurred handwritten character sequences for which compound character models were previously generated. Once recognized, the compound characters are expanded into the constituent individual characters comprising the compound character.

29 Claims, 3 Drawing Sheets

(i) Character Alignment ⟶ s / i / n / g / i / n / g (ii) Compound Characters ⟶ i n     i n g (iii) Compound Character Alignment ⟶ s / <u>i n</u> / g / i / n / g
s / <u>i n g</u> / i / n / g
s / i / n / g / <u>i n</u> / g
s / i / n / g / <u>i n g</u>

HANDWRITING RECOGNITION SYSTEM AND METHOD USING COMPOUND CHARACTERS FOR IMPROVED RECOGNITION ACCURACY

BACKGROUND

1. Technical Field

The present application relates generally to handwritten text recognition and, more particularly, to a handwriting text recognition system and method whereby character sequences are modelled as single characters ("compound character models") in order to improve recognition accuracy of converting handwritten text to machine printed text.

2. Description of the Related Art

Currently, the need for accurate machine recognition of handwritten text has increased due to the popularity and wide spread use of handheld, pen-based computers. However, the ability to achieve high recognition accuracy with conventional machine recognition devices has proven to be a difficult task due to the wide variety of individual handwriting styles, many of which have ambiguous and/or conflicting character representations. This difficulty is further compounded by the fact that, even for a particular writer, the manner in which a given letter is written can vary dramatically depending on the location of the letter in the word.

In particular, letters at the end of word are frequently written less carefully than letters at the beginning of the word due to the tendency of writers to "slur" together ending characters of a written word. For instance, due to "slurred" handwriting, character sequences such as "ing", "ous" and "ion", which commonly appear at the ends of words, typically bear little resemblance to the same letters (or combination of letters) that appear in other locations of the same word. And yet, these "slurred" character sequences contain enough information for a human reader to recognize them correctly.

Conventional methods for machine recognition of handwritten text typically recognize a word by recognizing constituent characters of the word using statistical models (i.e, character models) that are previously generated for characters comprising a given vocabulary. Conventional. handwriting recognition systems are not trained to recognize slurred handwritten character sequences. Consequently, decreased recognition accuracy is realized when decoding slurred character sequences.

SUMMARY

The present application is directed to a handwriting recognition system and method whereby various character sequences are each modelled as a single character ("compound character model") so as to provide improved recognition accuracy when decoding "slurred" character sequences.

In one aspect of the present invention, a method for generating a handwriting recognition system having compound character models, comprises the steps of:

providing an initial handwriting recognition system having individual character models;

collecting and Labelling a set of handwriting data;

aligning the labelled set of handwriting data;

generating compound character data using the aligned handwriting data; and retraining the initial recognition system with the compound character data to generate a new recognition system having compound character models.

In another aspect of the present invention, a system for recognizing handwritten text, comprises:

means for inputting handwritten text;

means for storing a plurality of character models, the character models including individual character models and compound character models;

means for decoding the input handwritten text using the individual character models and the compound character models such that when the decoding means detects a compound character, the compound character is expanded into its corresponding constituent individual characters; and means for outputting the decoding results.

These and other aspects, features and advantages of the present invention will become apparent from the following detailed description of preferred embodiments, which is to be read in connection with the accompanying drawings.

DETAILED DESCRIPTION OF PREFERRED EMBODIMENTS

It is to be understood that the term "compound character model" used herein refers to a model which is trained to recognize a specific sequence of two or more handwritten characters (e.g., "ing" and "ion"). It is to be further understood that the term "compound character" used herein refers to a character sequence for which a compound character model is generated.

Figure 1:
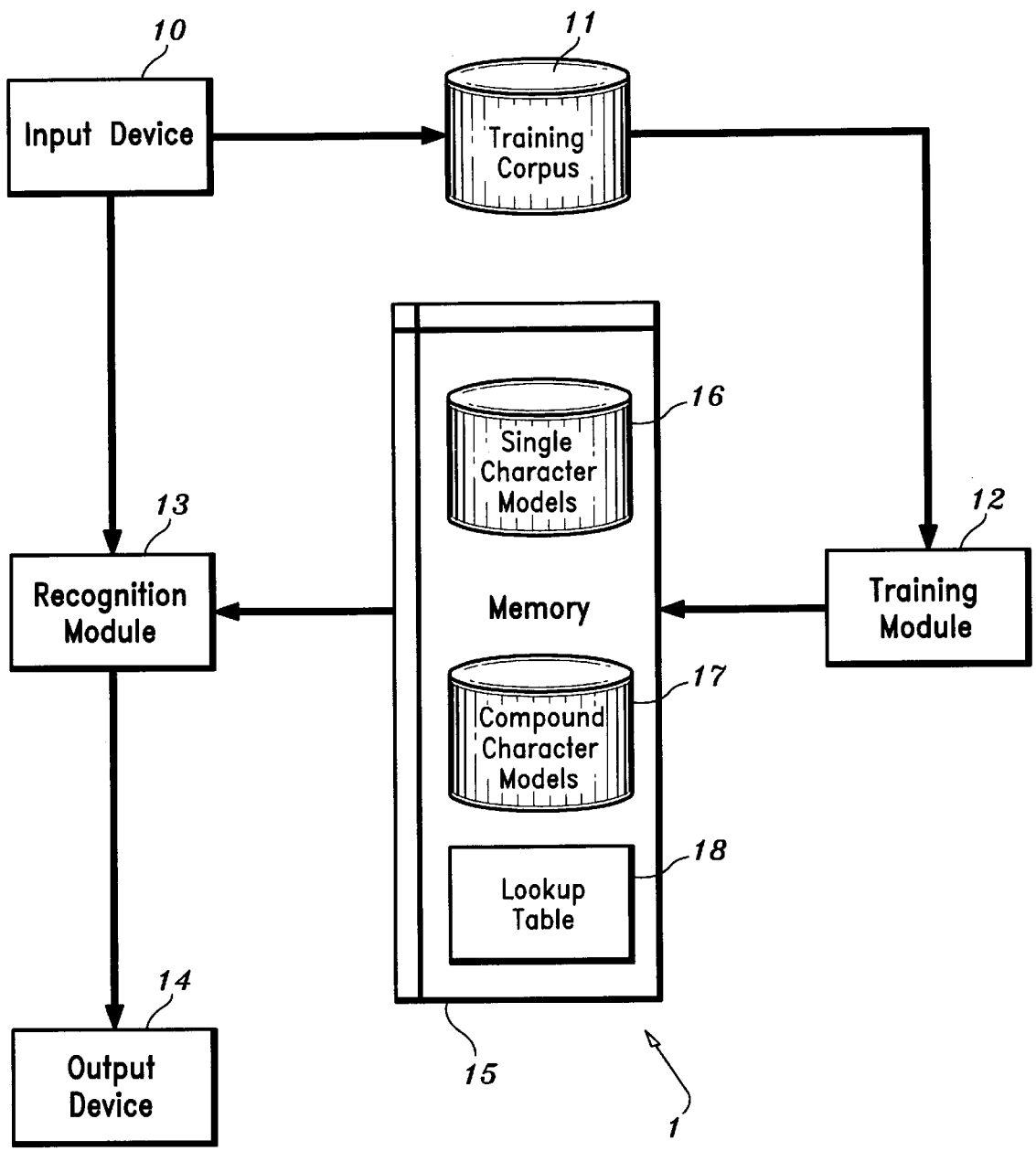
FIG. 1 is a block diagram which illustrates a handwriting recognition system in accordance with one embodiment of the present invention.

Referring now to FIG. 1, a block diagram illustrates a handwriting recognition system in accordance with an embodiment of the present invention. The system 1 includes an input unit 10 for inputting data, e.g., samples of handwritten text. In particular, the input unit can be any conventional device such as a digitizing tablet (i.e., pen-based computer) for real-time digitization and recognition of text which is directly written on the tablet, or an OCR scanner for inputting handwritten text.

The system 1 includes a database for storing a training corpus 11 which comprises a plurality of handwriting data which is used to train the system 1 and generate character models via a training module 12. For a writer-independent unconstrained handwriting system (i.e., a system which recognizes the handwriting of many writers and in which no restriction is placed on the style or content of the handwriting to be recognized), the training corpus 11 is typically comprised of a representative set of handwriting samples which are collected from a random population of individuals (e.g., a collection of handwriting samples for various character belonging to a given written language to be recognized, as well as punctuation characters and any special symbols (e.g. "$" and "&")). On the other hand, the training corpus 11 for a "writer-dependant" unconstrained handwriting system (i.e., a system which is trained to recognize the handwriting of a particular individual and which no restriction is placed on the style or content of the handwriting to be recognized) is typically comprised of a collection of handwriting samples of characters from the particular individual. It is to be understood that the present invention may also be implemented with a "constrained" handwriting system (i.e., a system in which constraints are placed on the content (numbers, dates, etc.) or the style (cursive, discrete) of the handwriting to be recognized).

The handwriting data (i.e., training corpus) may be stored in any suitable conventional format such as a bitmap image (which is typically generated with "off-line"/"static" OCR scanning) or as a sequence of X-Y coordinates which represent the location of a pen writing tip on the input device 10 at successive points in time (which is generated with an "on-line"/"dynamic" pen-based computer).

As noted above, the training module 12 utilizes the training corpus 11 to train the system 1. The result of the training process is a set of character models which are stored in memory 15. The character models include a database of individual character models 16 (i.e., statistical parameters) corresponding to the standard characters for a given vocabulary, which are trained using conventional methods suitable for handwriting recognition. In addition, a database of compound character models 17 is generated and trained in accordance with the present invention as discussed in further detail below with reference to FIGS. 2 and 3. These compound character models 17 are used during decoding to recognize "slurred" character sequences to thereby improve the decoding accuracy of the system 1.

The memory 15 also includes a lookup table 18 in which individual character labels (and their corresponding character models) and compound character labels (and corresponding compound character models) are mapped to integers. In particular, for each individual character in a given vocabulary, a character label and the corresponding character model are assigned a standard ASCII code (as is known in the art). In addition, for each compound character, a compound character label and the corresponding compound character model (which are previously defined and trained as discussed below in detail with reference to FIGS. 2 and 3) is assigned to a single index (e.g., ASCII code) which is not assigned to a standard character.

A recognition module 13 is utilized during a recognition process to recognize handwriting data of a given individual which is input via the input device 10. The recognition module 13 decodes the input handwriting data utilizing the single character models 16 and the compound character models 17 stored in memory 15 to recognize the handwriting of the individual. The lookup table 18 is accessed by the recognition module 13 after decoding handwriting data in order to obtain the text character (i.e., label) that corresponds to the decoded data. Advantageously, compound characters are recognized (interpreted) as a single character using the compound character models. When a compound character is recognized, the recognition module 13 will expand the compound character to its corresponding constituent characters and the recognition results will be modified accordingly. For instance, assuming the character sequence "ing" is detected and the corresponding internal code is obtained from the lookup table 18, the recognition module 13 will translate the internal code for the compound character "ing" into an "i", an "n" and a "g".

The recognition results are then converted into machine printed text via the recognition module 13 using techniques known by those skilled in the art. The recognition results of the recognition module 13 are output via output device 14 (which can be, e.g., a computer display).

It is to be understood that the handwritten text recognition system and method described herein may be implemented in various forms of hardware, software, firmware, or a combination thereof. In particular, the training module 12 and the recognition module 13 are preferably implemented in software as an application program which is executed on a general purpose computer having any suitable and preferred microprocessor architecture. It is to be further understood that, because some of the constituent system components and method steps of the present invention described herein are preferably implemented as software modules, the actual connections shown in FIG. 1 (or the process steps illustrated in FIGS. 2 and 3) may differ depending upon the manner in which the present invention is programmed. Of course, special purpose microprocessors may be employed to implement the system. Given the teachings herein, one of ordinary skill in the related art will be able to contemplate these and similar implementations or configurations of the present system and method.

Preferably, the system illustrated in FIG. 1 is implemented on a computer platform including hardware such as one or more central processing units (CPU), a random access memory (RAM), and input/output (I/O) interface(s). The computer platform also includes an operating system and microinstruction code. The various processes and functions described herein such as training, alignment and recognition may be either part of the microinstruction code or application programs which are executed via the operating system. In addition, various other peripheral devices may be connected to the computer platform such as an additional data storage device and a printing device.

Figure 2:
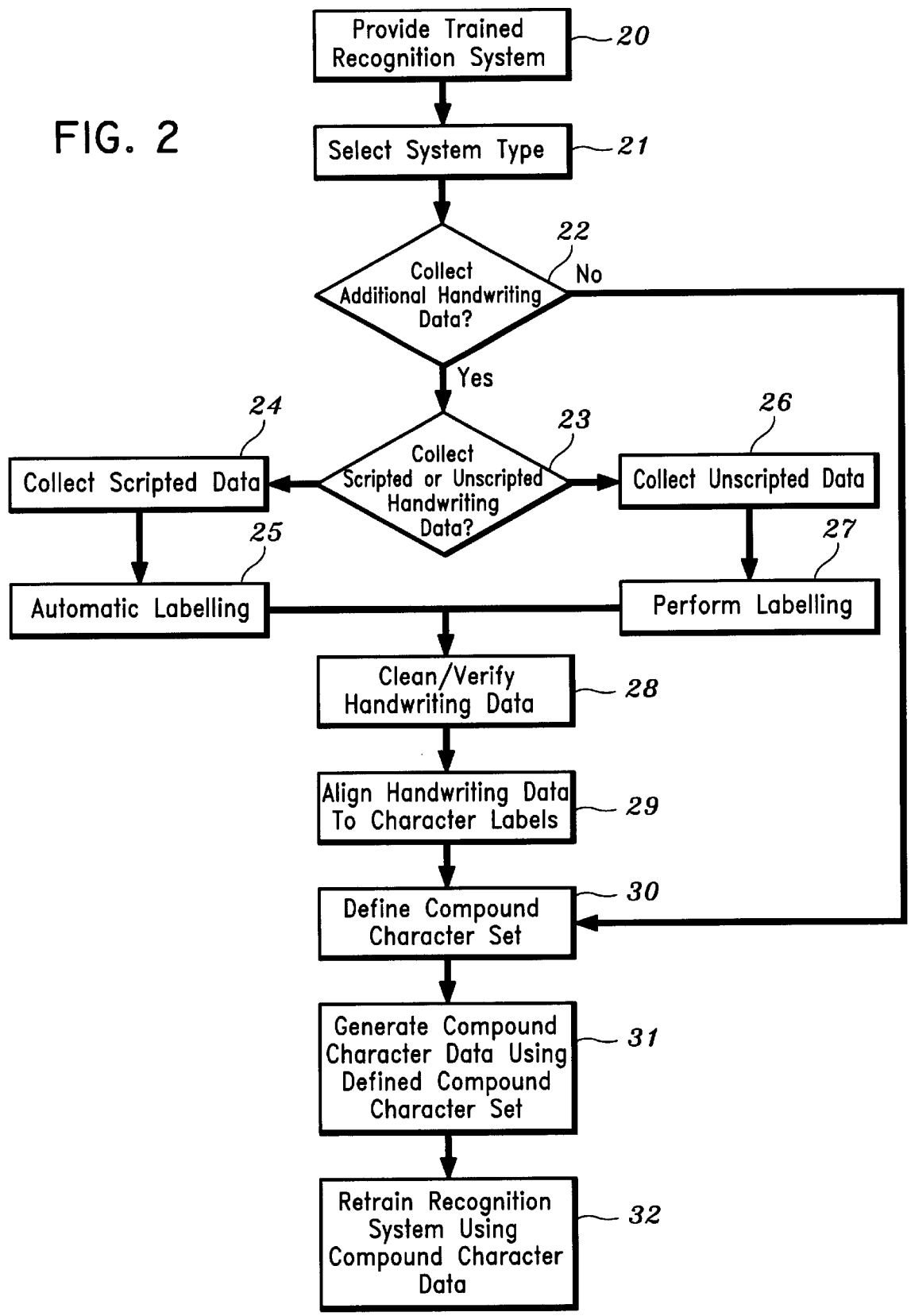
FIG. 2 is a flow diagram which illustrates a method for generating a handwriting recognition system having compound character models in accordance with one aspect of the present invention.

Referring now to FIG. 2, a flow diagram illustrates a method for generating a handwriting recognition system having compound character models in accordance with one aspect of the present invention. Initially, the user will obtain an initial recognition system (step 20) which has trained individual character models only (i.e., the initial recognition system does not include trained compound character models). The initial trained recognition system may be either an existing recognition system (which the user desires to modify in accordance with the methods described herein to recognize compound characters), or created by the user using techniques known by those skilled in the art (i.e., the initial recognition system may be generated by performing steps such as collecting a first set of handwriting data samples, cleaning and aligning the data samples, and training individual character models). It is to be understood that the initial trained recognition system may be a writer-independent system (i.e., a system which is trained to recognize the handwriting of many different writers). Alternatively, the initial recognition system may be a writer-dependent system (i.e., a system trained to recognize the handwriting of a particular writer).

After the initial recognition system is obtained (or created) (step 20), the user will select the type of "specialized" recognition system (i.e., a recognition system trained with compound character models) to be generated (step 21). For instance, the specialized recognition system may be implemented as either a "writer-independent" system if it is to be utilized by a plurality of writers or a "writer-dependant" system if it is to be used by a single writer.

Next, the user will decide whether to collect additional handwriting data for training the specialized recognition system (step 22). For instance, assuming that the initial recognition system (step 20) is "writer-independent" and that the user wants to create a specialized "writer-independent" system (step 21), the user may utilize the same handwriting data samples that were used to train the initial recognition system (negative determination in step 22 and skip to step 30). Likewise, assuming that the initial recognition system is "writer-dependent" and that the user wants to create a specialized "writer-dependent" system, the user may utilize the same "writer-dependent" handwriting data samples that were used to train the initial recognition system.

Preferably, a second set of writer-independent handwriting data and writer-dependant handwriting data is collected for generating the specialized writer-independent system and specialized writer-dependent system, respectively (affirmative result in step 22). This ensures that the specialized recognition system is not biased in favor of one set of handwriting data, which may result in less-than-optimal recognition accuracy as is understood by those skilled in the art.

It is to be understood that if a specialized writer-independent system is desired, the initial recognition system should be writer-independent. Otherwise, the user must either obtain a writer-independent system or collect writer-independent data and generate the initial writer-independent system. Then, as discussed above, either the collected writer-independent data may be used to create the specialized writer-independent system or additional writer-independent data may be collected. Likewise, if a specialized writer-dependent system is desired, the initial recognition system should be a writer-dependant system. Otherwise, the user must obtain or generate an initial writer-dependent recognition system and either use the collected writer-dependent handwriting data or obtain additional writer-dependent data to generate the specialized writer-dependent system.

Assuming that the user chooses to collect additional handwriting data (affirmative decision in step 22), the user will select one of several methods for collecting the additional handwriting data samples (step 23). For instance, an "unscripted" or "general" text collection may be obtained whereby the writer inputs (via the input device 10 of FIG. 1) whatever handwriting data samples the writer desires. Alternatively, a "scripted text" collection may be obtained, whereby the writer inputs handwriting data samples in accordance with a preferred script. The "scripted" method for collecting handwriting samples is the preferred method since the handwriting samples are known in advance (thereby obviating the need for performing additional labelling steps as discussed below). In addition, it virtually guarantees that the desired compound characters will be provided, while keeping the handwriting data set as small as possible.

Next, assuming the additional handwriting samples are collected via the "scripted" method (step 24), the handwriting data will be automatically "sentence-level" labelled (step 25). The term "sentence" refers to any size grouping of handwriting data (characters) which falls between a predetermined maximum and minimum group size. The term "sentence-level labelling" refers to a process whereby each "sentence" is associated with known text. Sentence-level labelling of scripted text is automatically performed since the recognition system knows a priori which text is associated with the input handwriting data samples.

On the other hand, if the additional handwriting samples are collected via the "unscripted" method (step 26), sentence-level labelling (step 27) may be performed in one of several ways. For instance, sentence-level labelling may be performed manually (the preferred method) by the writer specifying what he/she wrote. This may be done, for example, via an application program embodying the present invention, whereby the input handwriting data is displayed on a computer monitor and the writer is prompted to mark (or otherwise select) each written sentence/word of the displayed handwriting and type the corresponding text version of the marked sentence/word. Alternatively, sentence-level labelling of the "unscripted" handwriting data may be performed automatically by decoding the input handwriting data using the previously trained recognition system and applying the decoding results to obtain the labels using methods known by those skilled in the art.

After the handwriting data is labelled (steps 25 or 27), the labelled handwriting data may be cleaned/verified (step 28). It is to be understood that the cleaning/verification phase is optional for both the scripted and unscripted handwriting data collections and is not necessary for implementing the present invention. The cleaning/verification process, however, is preferably performed to ensure that "dirty" or "noisy" handwriting data is eliminated, thereby preventing the potential generation of sub-optimal models during the training process.

The cleaning/verification process (step 28) may be performed manually or automatically. For instance, cleaning/verification may be manually performed via an application program embodying the present invention, whereby both the input handwriting data and corresponding text (label) are simultaneously displayed such that the user can view the handwriting data and the corresponding labels. In this manner, the handwriting data samples can be then manually cleaned by reviewing the labelled data samples and removing and deleting incorrect labels and/or handwriting data which the user feels is, e.g., an aberration of the user's normal style of writing (i.e., noisy handwriting data).

Alternatively, the handwriting data samples may be cleaned automatically by decoding the handwriting data (with the known labels) using the initial trained recognition system, and then taking only those decoding results which have a probability that exceeds a predetermined threshold. In this manner, the decoded handwriting data samples which do not match their corresponding (known) labels within a specified probability threshold limit are deemed noisy data and, thus, discarded. In addition, if a label is not aligned with any particular handwriting data, it may be discarded.

After the handwriting samples are labelled and cleaned (optional), an alignment procedure is performed to align each character of the sentence-level labelled handwriting data with the corresponding text (character label) (step 29). Preferably, the alignment procedure is performed automatically, although it may be performed manually. Since the present handwriting recognition system is preferably implemented using Hidden Markov Models (HMM) (which are well known to those skilled in the art), alignment may be performed automatically using the well-known Viterbi alignment procedure such as disclosed in "A Tutorial On Hidden Markov Models and Selected Applications in Speech Recognition" by L. R. Rabiner, Proceedings of IEEE, Vol. 77 #2, pp. 257–286, February, 1989. Specifically, as is understood by those skilled in the art, the handwriting data is initially processed as a sequence of frames. The Viterbi alignment procedure matches (aligns) the frames comprising each handwritten character to the corresponding character labels. Therefore, the alignment places boundaries between the sequence of frames to identify which frames are associated with each handwritten character. The alignment procedure is necessary for training character models since it is important to know which handwriting data (i.e., frames of data) correspond to a given (character) model.

Accordingly, since the collected handwriting samples are previously sentence-level labelled, it is possible to determine the optimal alignment for each handwritten character of the handwriting data with its corresponding character label.

Alternatively, alignment may be performed manually via the computer program embodying the present invention, whereby the (labelled and cleaned) handwriting data is displayed on the computer monitor and the user is prompted to mark (or otherwise separate) each written character of the displayed handwriting data. In this manner, all frames corresponding to the marked handwritten character are properly aligned with the proper character label.

Next, a set of compound characters is defined (step 30). This can be performed one of several ways. For instance, the compound character set can be automatically defined by decoding on a separate held out set of samples (i.e., arbitrarily dividing the data collection (steps 24 or 36) into two sets so as to prevent the system from being biased for one set of data) and tallying which combinations of letters are incorrectly recognized most frequently.

Alternatively, the set of compound characters may be manually defined. In particular, the user of the system may determine which character sequences are incorrectly recognized and then specify which sequences should be modeled as compound characters. Likewise, the designers of the system 1 may generate a "canned" list (i.e., predetermined list) of compound characters bas ed on writer independent recognition accuracies. Moreover, the frequency of occurrence of certain character sequence s in a given language and/or in the available handwriting data may be considered for determining which compound characters model should be trained. For example, the user can determine whether or not to train a given compound character model depending on whether the frequency of occurrence of the character sequence exceeds some predetermined threshold.

Figures 3A, 3B:
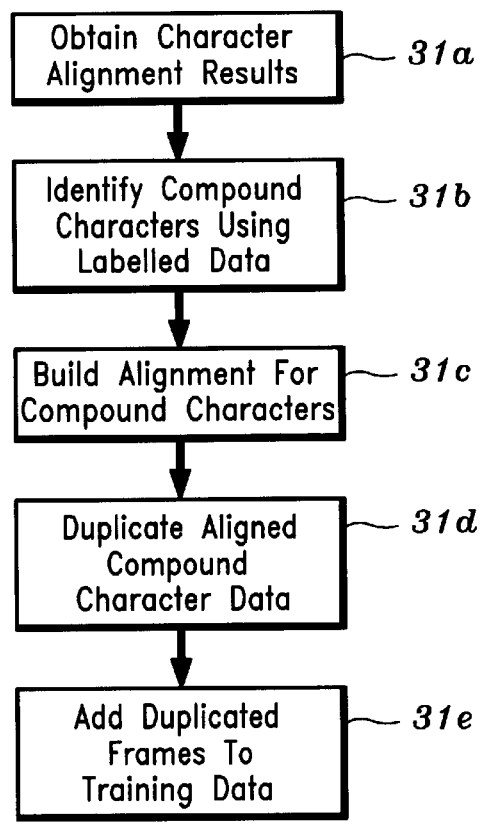
FIGS. 3a and 3b diagrams which illustrate a method for generating compound character training data in accordance with one aspect of the present invention.

Next, compound character data (which is used for training the specialized recognition system) is generated (step 31) by utilizing the defined compound character set (from step 30) together with the aligned handwriting data samples (from step 29). One method for generating compound character data is illustrated by the diagrams of FIGS. 3a and 3b. Referring to FIG. 3a, initially, the results of the character alignment process (i.e., character alignment data) (in step 29) are obtained (step 31a). As discussed above in detail, the character alignment process aligns frames for each handwritten character to a corresponding character label. For instance, referring to FIG. 3b(*i*), the frames associated with each handwritten character of the word "singing" are aligned to their corresponding character label (as delineated by each forwardslash). It is to be understood that if the handwriting data (training data) from the initial recognition system is used (i.e., no additional handwriting data is collected (in step 22)), then the character alignment of the initial recognition system may be utilized for generating the compound character data.

Next, the compound characters contained in each word are identified using the defined compound character set and the aligned character labels. For instance assuming the compound character "in" and "ing" are previously defined as shown in FIG. 3b(*ii*), the word "singing" would have four compound characters identified therewith: the first and second occurrence of "in" and the first and second occurrence of "ing." After the compound characters of a given word are identified, the above character alignment is modified for each of the identified compound characters (step 31c) by combining the frames of each individual character comprising the compound character (as shown in FIG. 3b(*iii*)). Then, the combined frames are mapped with a "new character label" corresponding to the compound character. Specifically, as discussed above, each new character label for a given compound characters is mapped with an integer value and stored in the lookup table 18 (FIG. 1). In this manner, it is to be appreciated that each compound character is treated as a single character.

Next, the aligned compound character data (the combined frames corresponding to the character sequence) is "duplicated" (step 31d) and the duplicated frames are added to the training data (step 31e). Alternatively, a "constrained duplication" method may be implemented which is similar to the duplication method discussed above except that duplication occurs only when the identified compound character satisfies one or more pre-specified duplication constraints. For instance, assume a duplication constraint is applied which limits the duplication of compound characters to those which fall at the end of a word (where most slurring typically occurs). Then in FIG. 3b(*iii*), for instance, only the frames corresponding to the second "ing" and "in" in the word "singing" would be combined and duplicated. One of ordinary skill in the art could envision other constraints that may be applied for limiting the amount of compound character training data.

Referring again to FIG. 2., after the compound character data is generated, the compound character data is used for training compound character models using training methods known by those skilled in the art (step 32). It is to be understood that the duplication process discussed above (step 31d) is performed in order to separately utilize original character-aligned data to retrain the individual character models of the initial recognition system (if the user so desires) and the duplicated data to train compound character models. The individual and compound character models are employed by a specialized recognition system that is capable of providing increased recognition accuracy for compound characters.

Advantageously, by implementing the newly created recognition system, compound characters may be decoded and recognized by modifying the recognition process when compound characters are detected. In particular, as explained above, whenever a compound character is detected during decoding, the recognition result is modified in such a way that it expands the compound character to its corresponding constituent characters. For instance, when an "ing" compound character is detected, the recognition system translates its internal code for it into an "i", an "n" and a "g". Therefore, the present invention provides a method for enabling handwriting recognition systems to accurately recognize slurred character sequences by explicitly modelling such character sequences (compound characters) as single characters. Once these compound character models are trained, they may be used in the same manner as conventional character models are used in the recognition process.

Although illustrative embodiments have been described herein with reference to the accompanying drawings, it is to be understood that the present system and method is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. A method for training a handwriting recognition system, comprising the steps of:

defining a compound character set, the compound character set comprising one or more character sequences that are to be modeled as compound characters;

generating compound character data using the compound character set and a training corpus of handwriting data associated with an initial handwriting recognition system; and retraining the initial recognition system using the compound character data to generate a new recognition system having compound character models, wherein the compound character models comprise a statistical model of each character sequence in the compound character set modeled as a single character, wherein the step of generating compound character data comprises:

obtaining character alignment data from the initial handwriting recognition system;

identifying each character sequence in each word in the training corpus that corresponds to a defined compound character in the compound character set using the character alignment data;

combining the character alignment data associated with each character of the identified character sequence; and duplicating the combined character alignment data to generate the compound character data.

2. The method of claim 1, wherein the step of defining a compound character set comprises the substeps of:

decoding a separate heldout set of handwriting data of the training corpus;

selecting from the decoding results each incorrectly recognized character sequence as a compound character.

3. The method of claim 1, wherein the step of defining a compound character set comprises providing a predetermined list of character sequences that are to be modeled as compound characters.

4. The method of claim 1, wherein the step of defining a compound character set comprises selecting each character sequence in a given vocabulary as a compound character if the frequency of occurrence of the character sequence in the given vocabulary exceeds a predetermined threshold.

5. The method of claim 1, further including the step of providing at least one duplication constraint, wherein the step of duplicating the combined character alignment data occurs only if the corresponding character sequence satisfies the duplication constraint.

6. A method for training a handwriting recognition system, comprising the steps of:

collecting and labelling a set of handwriting data;

aligning the labelled set of handwriting data;

defining a compound character set, the compound character set comprising one or more character sequences that are to be modeled as compound characters;

generating compound character data using the compound character set and the aligned handwriting data; and retraining an initial recognition system using the compound character data to generate a new recognition system having compound character models, wherein the compound character models comprise a statistical model of each character sequence in the compound character set modeled as a single character, wherein the step of generating compound character data includes the substeps of:

identifying each character sequence that corresponds to a defined compound character using the aligned handwriting data;

combining frame data of each character associated with an identified character sequence; and duplicating the combined frame data to generate the compound character data.

7. The method of claim 6, wherein the step of collecting and labelling the set of handwriting data includes the steps of providing scripted text and automatically sentence-level labelling the scripted text with a priori known labels.

8. The method of claim 6, wherein the step of collecting and labelling the set of handwriting data includes the steps of providing unscripted text and sentence-level labelling the unscripted text.

9. The method of claim 8, wherein the step of labelling is performed by reviewing the collected set of handwriting data and associating a corresponding text label for each written word comprising each written sentence.

10. The method of claim 8, wherein the step of labelling is performed by decoding the set of handwriting data using the initial recognition system and applying labels to the set of handwriting data in accordance with the decoding results.

11. The method of claim 6, further comprising the step of cleaning and verifying the labelled handwriting data.

12. The method of claim 6, wherein the step of defining the set of compound characters includes the substeps of:

decoding a separate heldout set of handwriting data from the collected set of handwriting data;

selecting from the decoding results each incorrectly recognized character sequence as a compound character.

13. The method of claim 6, wherein the step of defining the set of compound characters includes providing a predetermined list of character sequences that are to be modeled as compound characters.

14. The method of claim 6, wherein the step of defining the set of compound characters includes selecting each character sequence in a given vocabulary as a compound character if the frequency of occurrence of the character sequence in the given vocabulary exceeds a predetermined threshold.

15. The method of claim 6, further including the step of providing at least one duplication constraint, wherein the step of duplicating the data associated with the aligned frames occurs only if the corresponding character sequence satisfies the duplication constraint.

16. A program storage device readable by machine, tangibly embodying a program of instructions executable by the machine to perform method steps for training a handwriting recognition system, the method steps comprising:

defining a compound character set, the compound character set comprising one or more character sequences that are to be modeled as compound characters;

generating compound character data using the compound character set and a training corpus of handwriting data associated with an initial handwriting recognition system; and retraining the initial recognition system using the compound character data to generate a new recognition system having compound character models, wherein the compound character models comprise a statistical model of each character sequence in the compound character set modeled as a single character, wherein the instruction for performing the step of generating compound character data comprises instructions for performing the substeps of:
  obtaining character alignment data from the initial handwriting recognition system;
  identifying each character sequence in each word in the training corpus that corresponds to a defined compound character in the compound character set using the character alignment data;
  combining the character alignment data associated with each character of the identified character sequence; and
  duplicating the combined character alignment data to generate the compound character data.

17. The program storage device of claim 16, wherein the instructions for performing the step of defining a compound character set comprises instructions for performing the steps of:
  decoding a separate heldout set of handwriting data of the training corpus;
  selecting from the decoding results each incorrectly recognized character sequence as a compound character.

18. The program storage device of claim 16, wherein the instructions for performing the step of defining a compound character set comprises instructions for performing the step of loading into said machine a predetermined list of character sequences that are to be modeled as compound characters.

19. The program storage device of claim 16, further including instructions for performing the step of applying at least one duplication constraint during the duplication step, such that the step of duplicating the combined character alignment data occurs only if the corresponding character sequence satisfies the duplication constraint.

20. A program storage device readable by machine, tangibly embodying a program of instructions executable by the machine to perform method steps for training a handwriting recognition system, the method steps comprising:
  prompting a user to input a set of handwriting data;
  labelling the input set of handwriting data;
  aligning the labelled set of handwriting data;
  defining a compound character set, the compound character set comprising one or more character sequences that are to be modeled as compound characters;
  generating compound character data using the compound character set and the aligned handwriting data; and
  retraining an initial recognition system using the compound character data to generate a new recognition system having compound character models, wherein the compound character models comprise a statistical model of each character sequence in the compound character set modeled as a single character,
  wherein the instructions for performing the step of generating compound character data includes instructions for performing the substeps of:
    identifying each character sequence that corresponds to a defined compound character using the aligned handwriting data;
    combining frame data of each character associated with an identified character sequence; and
  duplicating the combined frame data to generate the compound character data.

21. The program storage device of claim 20, wherein the input set of handwriting data is scripted text having a priori known labels and wherein the program storage device includes instructions for performing the step of automatically sentence-level labelling the input scripted text with the a priori known labels.

22. The program storage device of claim 20, wherein the input handwriting data is unscripted text and wherein the program storage device includes instructions for performing the step of sentence-level labelling the unscripted text.

23. The program storage device of claim 22, wherein the instructions for performing the step of labelling further includes instructions for performing the steps of:
  displaying the input handwriting data; and
  prompting the user to associate a corresponding text label for each written word of the displayed input handwriting data.

24. The program storage device of claim 22, wherein the instructions for performing the step of labelling further includes instructions for performing the steps of decoding the set of handwriting data using the initial recognition system and applying labels to the set of handwriting data in accordance with the decoding results.

25. The program storage device of claim 20, further including instructions for performing the steps of cleaning and verifying the labelled handwriting data.

26. The program storage device of claim 25, wherein the instructions for performing the steps of cleaning and verifying the labelled handwriting data further include instructions for performing the substeps of:
  displaying labelled data with the corresponding handwriting data;
  prompting the user to review the labelled handwriting data and delete one of noisy handwriting data, incorrectly labelled handwriting data, and a combination thereof.

27. The program storage device of claim 25, wherein the instructions for performing the steps of cleaning and verifying the labelled handwriting data further include instructions for performing the substeps of:
  decoding the labelled handwriting data using the initial recognition system;
  comparing the decoding results to the known labels; and
  discarding the handwriting data having decoding results with a probability that does not exceed a predetermined threshold limit for matching the corresponding known label.

28. The program storage device of claim 20, further including instructions for performing the step of providing at least one duplication constraint, wherein the step of duplicating the combined frame data occurs only if the corresponding character sequence satisfies the duplication constraint.

29. A system for recognizing handwritten text, comprising:
  means for inputting handwritten text;
  means for storing a plurality of character models, said character models including individual character models and compound character models;
  means for decoding the input handwritten text using said individual character models and said compound character models such that when said decoding means detects a compound character, the compound character is expanded into its corresponding constituent individual characters; and
  means for outputting the decoding results, wherein the handwriting recognition system further comprises means for training the compound character models, comprising:

means for defining a compound character set, the compound character set comprising one or more character sequences that are to be modeled as compound characters;

means for generating compound character data using the compound character set and a training corpus of handwriting data associated with an initial handwriting recognition system; and retraining the initial recognition system using the compound character data to generate the handwriting recognition system having compound character models, wherein the compound character models comprise a statistical model of each character sequence in the compound character set modeled as a single character, wherein the step of generating compound character data comprises:

obtaining character alignment data from the initial handwriting recognition system;

identifying each character sequence in each word in the training corpus that corresponds to a defined compound character in the compound character set using the character alignment data;

combining the character alignment data associated with each character of the identified character sequence; and duplicating the combined character alignment data to generate the compound character data.

* * * * *